Patented Nov. 27, 1928.

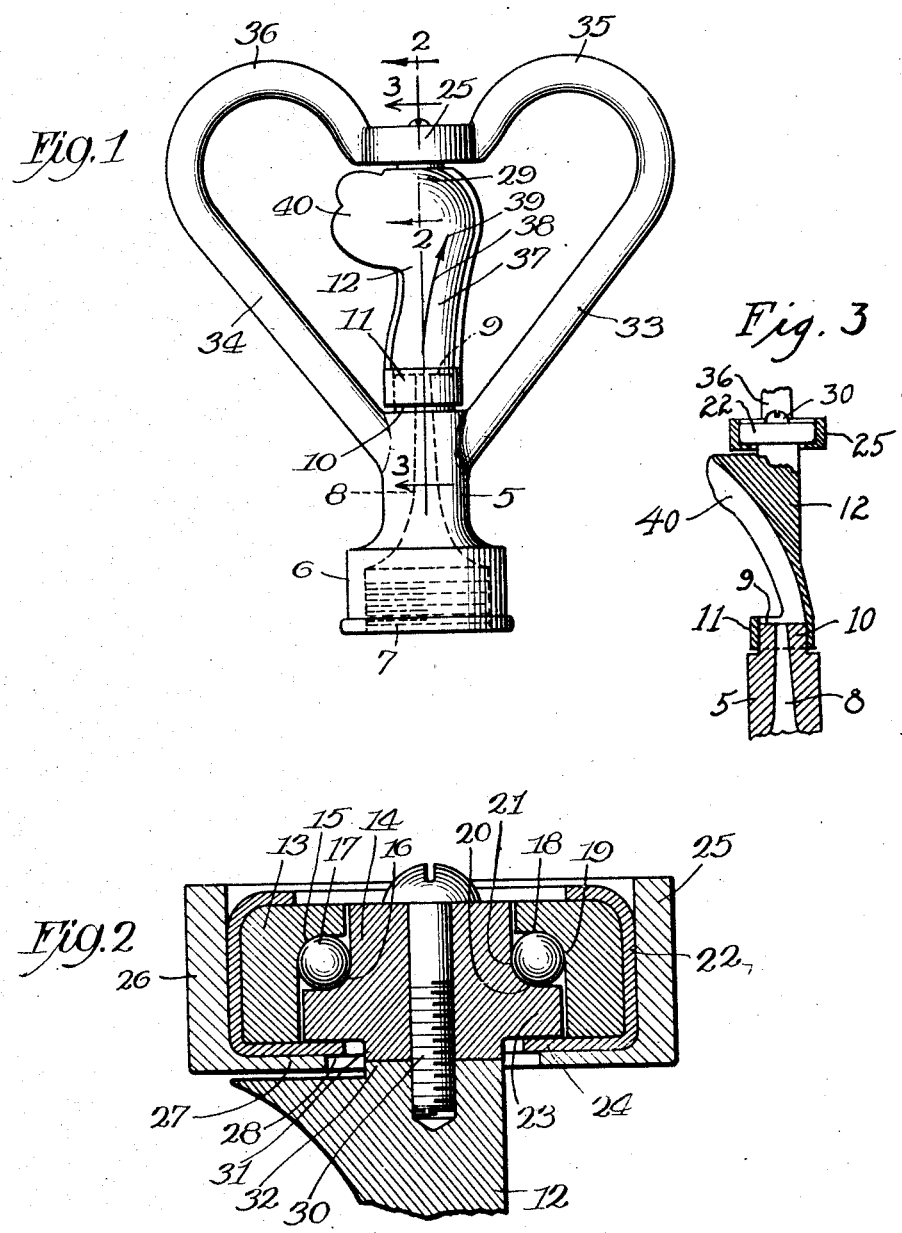

1,693,245

UNITED STATES PATENT OFFICE.

HARRY E. MENG, OF OAK PARK, ILLINOIS, ASSIGNOR TO W. D. ALLEN MANUFACTURING COMPANY, OF CHICAGO, ILLINOIS, A CORPORATION OF ILLINOIS.

SPRINKLER HEAD.

Application filed December 31, 1926. Serial No. 158 138.

This invention relates to sprinkler heads, and more particularly to sprinkler heads such as are commonly used in watering lawns and gardens, and which are provided with a part adapted to be rotated by the force of the water as it is discharged, and which rotating part is effective to break up a stream of water into a suitable spray.

The objects of the invention are to provide a sprinkler of the class described which will be effective to produce an evenly distributed spray of water; to provide means for facilitating rotation of the rotating part, and in general, to provide a sprinkler head of the class described which will not readily wear away, due to the rotation of the rotating part and which will consequently, give lasting efficient service.

Further objects and advantages will be understood by reference to the following specification in connection with the accompanying drawing in which I have illustrated a selected embodiment of my invention and in which Fig. 1 is a side elevation, and
Fig. 2 is a section on the line 2—2 of Fig. 1.
Fig. 3 is a section on the line 3—3 of Fig. 1.

Referring now to the drawings, I have illustrated a nozzle 5 having an enlarged end portion 6 provided with an internal screw threading 7, adapted to be connected to a stand pipe or to the end of a garden hose or the like. The nozzle 5 is centrally apertured as at 8 with a gradually tapering aperture which at the upper or discharge end 9 of the nozzle is slightly smaller than at its lower end.

The upper end of the nozzle is provided with a reduced bearing portion 10 which is adapted to receive the lower end 11 of a rotatable member 12. The said lower end 11 consists of a ring-like band which embraces the bearing portion 10 of the nozzle whereby the rotating member 12 is rotatably mounted at its lower end of the nozzle.

The upper end of the rotating member is rotatably supported by means of an anti-friction bearing which preferably comprises a combination radial and end thrust ball bearing. This bearing consists of outer and inner races 13 and 14 respectively, which are provided with oppositely disposed ball races 15 and 16 respectively. Suitable balls 17 are disposed between the said ball races and are adapted to permit free rotation of the inner race 14 relative to the outer race 13. The ball race 15 in the outer race 13 is formed so as to provide an end wall 18 and a side wall 19 and the inner ball race 16 is formed in the race 14 so as to provide an end wall 20 and a side wall 21, which are respectively disposed opposite the end and side walls of the outer race. It will be obvious that end-thrust between the inner and outer race members is taken up by the balls 17 between the end walls 18 and 20 and that radial thrust between the said members is taken up between the walls 19 and 21. A casing 22 embraces a portion of the outer race 13 and extends over a portion 33 of the inner race as at 24, so as to prevent separation of the two parts of the bearing. The member 22 is preferably a sheet metal member which may readily be swaged over the said parts.

The bearing member is mounted in a cup-like holder 25 comprising an annular side wall 26 and a bottom 27 which is axially apertured as at 28 to permit connection between the upper end 29 of the rotatable part 12 and the inner race 14 of the bearing member. Connection between these two members is preferably accomplished by means of a screw 30 extending through a suitable aperture in the race 14 of the bearing member and threadedly engaging the upper end of the rotating part, suitable bosses 31 and 32 preferably being provided on the connected parts for facilitating the said connection. The cup-like member 25 is fixedly connected to the nozzle 5 by means of a pair of arms 33 and 34 which are preferably integral with the nozzle and which extend upwardly and diverge outwardly therefrom, and which are rebent as at 35 and 36 so as to connect with said cup-shaped member, these members also preferably being integral.

The rotating part 12 includes a channel like portion indicated at 37, disposed above its lower end 11 and which is shaped so that water discharged from the nozzle is caused to follow a course approximately such as indicated by the arrow 38 and whereby pressure is exerted against one wall of the channeled portion of the rotating part, such pressure being exerted off-center in the vicinity indicated by the arrow head 39. Such pressure causes the part 12 to rotate rapidly on its bearings and the projecting portion or fin 40 is effective to break up the stream of water into a suitable spray. Such pressure also urges the member 12 in an upward direction which upper movement or end-thrust is limited by the bearing member as above described. The bearing member may be secured in the cup 25 in any suitable manner, which in the present embodiment consists merely of frictional engagement between the outside of the member 22 and inside of the cup 25. I may also swage the upper end of the cup 25 over the adjacent end of the bearing to provide a positive holding means.

I am aware that various changes in the form and construction of my improved sprinkler head may be made without departing from the spirit of the invention which should be determined by reference to the following claims.

I claim as my invention:

1. In a sprinkler head of the class described, the combination of a nozzle, a spraying member adapted to be rotated by pressure of water discharged from said nozzle, means for rotatably supporting said spraying member in operative position relative to said nozzle, said means comprising a bearing portion on the upper end of said nozzle, a bearing member on the lower end of said spraying member for engaging said nozzle bearing portion, combination radial and end thrust ball bearing anti-friction means for the upper end of said spraying member, and means for mounting said ball bearing anti-friction means comprising a cup-shaped member having an axial aperture in its bottom, means integral with said nozzle for supporting said cup-shaped member in fixed position relative to said nozzle, said cup-shaped member being adapted to receive said ball bearing anti-friction means and said spraying member being connected to a part of said ball bearing anti-friction means through said axial aperture.

2. In a sprinkler of the class described, the combination of a nozzle, a spraying member rotatably mounted at one end on said nozzle and adapted to be rotated by the force of fluid discharged therefrom, such force normally tending to force the spraying member away from the nozzle, and means for rotatably supporting the outer end of said spraying member and effective to retain the member in operative position relative to the nozzle, said means including an annular bearing member fixedly connected to said nozzle, a bearing portion adjacent the outer end of said spraying member and rotatably mounted in said annular bearing member, and a plurality of anti-friction members interposed between said bearing portion and annular bearing member for facilitating rotation of the spraying member.

3. In a sprinkler of the class described, the combination of a nozzle, a spraying member rotatably mounted at one end on said nozzle and adapted to be rotated by the force of fluid discharged therefrom, such force normally tending to force the spraying member away from the nozzle, and means for rotatably supporting the outer end of said spraying member and effective to retain the member in operative position relative to the nozzle, said means including an annular member fixedly connected to said nozzle, a ball-bearing member mounted in said annular member and including inner and outer races and a plurality of balls interposed between said races for facilitating rotation of the inner race within said outer race, and said inner race being connected to the outer end of said spraying member so as to rotatably support said outer end.

4. In a sprinkler of the class described, the combination of a nozzle, a spraying member rotatably mounted at one end on said nozzle and adapted to be rotated by the force of fluid discharged therefrom, such force normally tending to force the spraying member away from the nozzle, and means for rotatably supporting the outer end of said spraying member and effective to retain the member in operative position relative to the nozzle, said means including an annular member fixedly connected to said nozzle, a combination radial and end-thrust ball-bearing member mounted in said annular member and including inner and outer races and a plurality of balls interposed between said races for facilitating rotation of the inner race within said outer race, and said inner race being connected to the outer end of said spraying member so as to rotatably support said outer end.

HARRY E. MENG.